July 28, 1970  T. D. KACZMAREK  3,522,077

INERT PLASTIC PACKAGE FOR LIQUID REAGENT

Filed Aug. 4, 1967

WITNESSES

INVENTOR
Thomas D. Kaczmarek
BY
ATTORNEY

United States Patent Office 3,522,077
Patented July 28, 1970

3,522,077
INERT PLASTIC PACKAGE FOR LIQUID REAGENT
Thomas D. Kaczmarek, Pittsburgh, Pa., assignor to Westinghouse Electric Corporation, Pittsburgh, Pa., a corporation of Pennsylvania
Filed Aug. 4, 1967, Ser. No. 658,391
Int. Cl. B65d 65/42
U.S. Cl. 117—94        7 Claims

ABSTRACT OF THE DISCLOSURE

A liquid reagent container having the shape of a sack or blister and composed of sheet-like material of about 5 mils thickness of a solid chlorofluorocarbon polymer, the material containing a liquid chlorofluorocarbon polymer included either as an integral part of the material or as a coating applied to at least one side of the material to prevent embrittlement of the material during degassing, and the combination of the sheet-like chlorofluorocarbon polymer and the liquid chlorofluorocarbon polymer being degassed to remove reactive volatile constituents having molecular weights of up to about 750.

---

This invention was made in the course of, or under, contract No. DA 18-108-AMC-115-(A) with or for the benefit of the U.S. Department of Defense.

BACKGROUND OF THE INVENTION

Field of the invention

This invention relates to an inert plastic container for the packaging of liquid chemical reagents. More particularly, it pertains to a flexible plastic tubing for storage of small amounts of liquid chemical reagents which tubing is composed of chlorofluorocarbon polymer that has been modified to contain less than 0.5 p.p.m. of volatile constituents to avoid the contamination of or reaction with the reagents by the tubing.

Description of the prior art

There is a need for the storage of small amounts of liquid chemical reagents. A storage container for such reagents should have an easily breakable seal to enable use of the reagents when needed. The container itself should be of a material having a long shelf-life and inert to the reagent in the container as well as to chemicals in the surrounding area. Most importantly, the container itself must not affect the contained reagents nor react with chemicals in the surrounding area.

Various materials including numerous plastics have been considered and ultimately rejected for one or more shortcomings. Polymers of trifluorochloroethylene possess certain physical and chemical properties that make the polymers particularly desirable as surface coatings and impregnants, such as shown in Pat. No. 2,686,738. However, a polymer having high chemical stability is not sufficient to satisfy all the requisites of a reagent container of the type herein desired. The polymer must not only have a high molecular weight but must contain less than 0.5 p.p.m. of volatile constituents so as to not adversely affect the chemical reagent contained by the polymer. Moreover, inasmuch as most polymers having high molecular weight and very low volatile constituents are rather brittle, it is a further requisite that the particular polymer involved have high ductility in order to avoid cracking of the material and escape of the reagent prior to its intended release for use.

In accordance with this invention, it has been found that a chlorofluorocarbon polymer of the general formula $(CF_2\text{—}CFCl)_x$ treated in the manner described herein satisfies the requirements of high molecular weight, very low volatile constituents, and ductility as well as general inertness to nearly all chemical reagents. To obtain the required properties of chemical inertness and ductility, the chlorofluorocarbon polymer having a molecular weight of the order of 10,000 to 150,000 is coated or treated with a film of liquid chlorofluorocarbon polymer of a lower average molecular weight of about 800 to 1500 after which the coated material is degassed in a vacuum and at an elevated temperature to remove the volatile constituents of molecular weights of 750 and lower. The material is ductile and is then ready for use as a container for most chemical reagents.

Accordingly, it is a general object of this invention to provide an inert plastic container for packaging liquid chemical reagents which container has sufficiently low volatile constituent values to not adversely affect the contained reagents.

It is another object of this invention to provide a method for preparing a fluorocarbon polymer which may be used for packaging liquid reagents.

Finally, it is an object of this invention to satisfy the foregoing objects and desiderata in a simple and expedient manner.

SUMMARY OF THE INVENTION

Briefly, the liquid reagent container of the present invention comprises a chlorofluorocarbon polymer in the form of a sheet or tubing having a wall thickness of about 3 to 10 mils which polymer is preliminarily coated or treated with a liquid chlorofluorocarbon polymer after which it is degassed in a vacuum at a temperature ranging from about 175° to 225° F. for a period of from about 6 to 12 hours under a vacuum to remove all lower molecular weight fragments to a level of less than 0.5 p.p.m. so as to render the material ductile so that it will form a flexible sack which is impervious as well as inert to any chemical reagent contained therein.

BRIEF DESCRIPTION OF THE DRAWINGS

For a better understanding of the nature and objects of this invention, reference is made to the drawings, in which.

DESCRIPTION OF THE PREFERRED EMBODIMENT

Figure 1:
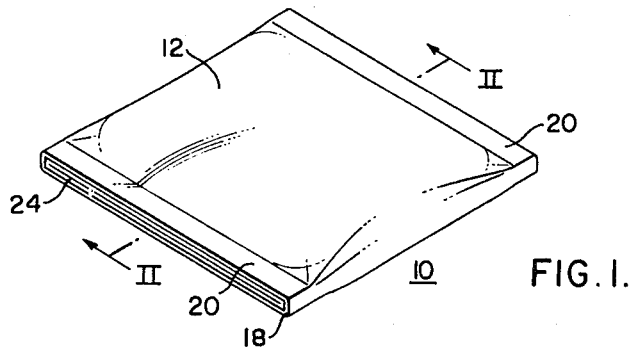
FIG. 1 is a perspective view of a sack or blister containing a chemical reagent.
Figure 2:
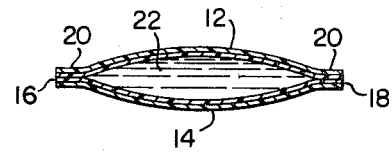
FIG. 2 is a transverse sectional view through the sack taken on the line II—II of FIG. 1.

A polymer container for chemical reagents of a composition described and treated or disclosed herein may have any size or configuration that is suitable for the use intended. One type of container for chemical reagents is a sack, blister, or pouch generally indicated at 10 in FIG. 1. As shown in FIG. 2 the sack 10 is composed of upper and lower sides 12 and 14 having at least two opposite ends 16 and 18 which are sealed together at 20 in a fluid-tight manner such as by ultrasonic bonding. The completely sealed sack contains a liquid reagent 22 such, for example, as an aqueous solution of sodium hydroxide, potassium carbonate, or copper chloride.

The sides 12 and 14 of the sack 10 may be fabricated from sheets or tubing of a fluorocarbon polymer having a very high molecular weight such as of the order of 10,000 to 150,000. The thickness of the sheet or tubing wall may vary from about 3 to 10 mils, a preferred thickness being about 5 mils. The composition of the sheet or tubing is a polymer of polychlorotrifluoroethylene of an average molecular weight of from 10,000 to 150,000. This preferred polymer has the general formulation $(CF_2-CFCl)_x$ and is derived from chlorotrifluoroethylene, $CF_2=CFCl$. Ordinarily the polymers of chlorotrifluoroethylene which are commercially available contain about 50 to 100 parts per million (p.p.m.) of volatile constituents such as dimers and trimers, the molecular weights of which vary from about 100 to 750. These volatile constituents are relatively reactive and would adversely affect a chemical reagent contained in a sack from which the polymer may be fabricated. For that reason, it is desirable to treat the polymer sheeting or tubing to remove the volatiles before fabrication into the sack-type container. In the past, one method for removing the volatile constitutents was simply to heat the polymeric plastic to a relatively low temperature for a long period of time such as up to 150° F. whereby the lower molecular weight fragments or volatile constituents of the polymer are volatilized and thereby removed. However, this treatment results in embrittlement of the polymers.

In accordance with the present invention, the method of removing the volatile constituents which avoids producing resulting brittle material is to apply a liquid fluorocarbon polymer similar to that of which the sheeting or tubing is composed but having a lower average molecular weight of about 800 to 1500. The added liquid polymer may be introduced either into the base resin before the sheet is formed or the tubing extruded. In the alternative, the added liquid polymer may be applied as a thin coating on the surface of the sheet or tubing.

The liquid polymer coated sheeting or tubing is then treated to remove the volatile constituents on both the solid polymer as well as the liquid polymers, by heating it to a temperature ranging from about 175° to 225° F. for a period of from 6 to 12 hours in a vacuum of about 25 mm. of mercury. The vacuum can be varied, a higher vacuum of for example 5 mm. of Hg used at the lower temperatures, while a vacuum of 50 or 100 mm. can be used at high temperatures. A preferred treatment comprises a temperature of about 195° F. for about 8 hours at 25 mm. of Hg.

Figure 3:
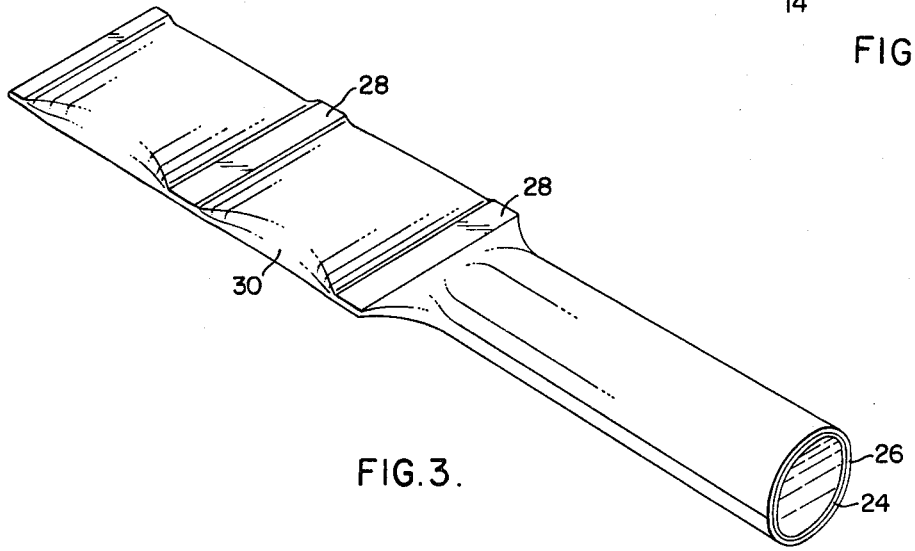
FIG. 3 is a perspective view of a segment of fluorocarbon polymer tubing, a portion of which is formed into sacks or blisters.

During the degassing period the volatile constituents comprising the lower molecular weight fragments are volatilized from the solid polymer while the higher polymer chain is relatively unaffected. The added liquid polymer is applied as a thin surface coating to one side of the sheet or tubing, as is illustrated in FIG. 3, where the film 24 of liquid polymer is applied on the inner surface of a tube 26 of the fluorocarbon polymer. The film of liquid polymer penetrates the entire thickness of the tube and acts as a plasticizer thereof and thereby prevents embrittlement of the tube which ordinarily occurs due to the removal of the volatiles.

After the degassing treatment the material is fabricated to form the sack 10. If sheets of fluorocarbon polymer are used, they may be cut into the desired size to form upper and lower sides 12 and 14 with opposite adjacent sides sealed with a small opening provided and then filled with a desired reagent through such opening and then completely sealed.

A preferred procedure is to use tubing of the treated fluorocarbon polymer which is readily fabricated into one or more sacks containing a reagent. For that purpose, the tube 26 is sealed in a known manner, such as ultrasonically, at one end and the tube is partially filled with the desired reagent through the open end. Thereafter the tubing is compressed slightly and sealed at regularly spaced intervals at 28 as shown in FIG. 3 to provide a plurality of sealed sack like tube segments 30 which are subsequently separated from each other by cutting through the center of the seals 28. It has been found that using a tube 26 of a diameter of about 5/16 inch and a wall thickness of 5 mils, a plurality of sacks 30 may be produced from the tube, each having a dimension of about 1/2 inch square.

Sufficient of the liquid polymer may be applied by dipping the tube in the liuid and letting it drain. Filling the interior of the tube and letting any excess drain off has given good results. Sheets of the chlorotrifluoroethylene polymer may be coated with the liquid polymer on one side and then the excess wiped off. The liquid polymer may comprise from 1/10% to 5% of the solid polymer. Such reagent filled sacks are inert and do not affect the reagent nor are affected by external chemicals, nor do they leak or deteriorate under normal storage and handling conditions and yet are capable of delivering the reagent contents when needed by squeezing manually, or cutting or piercing. Although the sacks are sealed ultrasonicaly it is understood that other sealing means may be used such as by the application of suitable heat and pressure or adhesives.

Test specimens of the sacks withstood a temperature of 65° C. for two weeks without deterioration. This is equivalent to a shelf-life of 2 to 3 years at room temperature.

Typical blisters or sacks as produced in the foregoing manner, namely 1/2 inch long segments of 5/16 inch polychlorotrifluoroethylene tubing of a 5 mils wall thickness, have been tested for burst strength and the results in pounds applied to a blister to cause it to break open are listed in the following table.

TABLE

| Blister No. | Burst strength (pounds) | Blister No. | Burst strength (pounds) |
|---|---|---|---|
| 1 | 5 | 7 | 27 |
| 2 | 12 | 8 | 5 |
| 3 | 24 | 9 | 12 |
| 4 | 17 | 10 | 6 |
| 5 | 15 | 11 | 17 |
| 6 | 11 | 12 | 7 |

The burst strength values listed in the table indicate that blisters or sacks of reagents may be provided which may be ruptured manually such as between the fingers of the user, yet are sufficiently strong to withstand normal handling or storage without rupture.

Accordingly, the treated fluorocarbon polymer package of the instant invention satisfies a long-felt want for a plastic container for liquid chemical reagents which is inert to the reagent and which does not contaminate the contained reagent. Moreover, the sack or blister under normal conditions has an exceedingly long shelf life without becoming embrittled and deteriorated due to long periods of storage.

It is understood that the above specification and drawings are merely exemplary and not in limitation of the invention.

What is claimed is:

1. A pliable, liquid reagent sac-like container consisting essentially of a solid chlorotrifluorocarbon polymer and from 1/10 to 5% of the weight of the solid polymer of a liquid chlorotrifluorocarbon polymer, the solid chlorotrifluorocarbon polymer having an average molecular weight of between 10,000 and 150,000 and the liquid chlorotrifluorocarbon polymer having an average molecular weight of about 800 to 1500, and the polymers forming the container having a volatile content of less than 0.5 p.p.m., when measured at 175° to 225° F. under a vacuum of 25 mm. Hg whereby it is substantially inert to reagents disposed in the container.

2. The reagent container of claim 1 in which the liquid chlorotrifluorocarbon polymer has been initially admixed with the solid chlorotrifluorocarbon polymer.

3. The reagent container of claim 1 in which the liquid chlorotrifluorocarbon polymer comprises a thin coating on at least one surface of the solid chlorotrifluorocarbon polymer.

4. A method of making a chlorotrifluorocarbon polymer material for packaging a liquid reagent and being inert to the reagent, comprising the steps of adding from about 1/10 to about 5 weight percent of a chlorotrifluorocarbon polymer having an average molecular weight of from 800 to 1500 to a chlorotrifluorocarbon polymer having an average molecular weight of between about 10,000 to 150,000, and heating the combined polymers to a temperature ranging from about 175° F. to 225° F. in a partial vacuum for a period of from about 6 to 12 hours to remove all volatile constituents having a molecular weight of up to 750.

5. The method of claim 4 in which the chlorotrifluorocarbon polymer is in the form of a tube of about 5 mils wall thickness to which the liquid chlorotrifluorocarbon is added as a thin coating to at least one side thereof.

6. The method of claim 4 in which the heating step is at about 195° F. for about eight hours and a vacuum of about 25 mm. Hg.

7. The method of claim 4 in which the volatile content of the combined polymer materials is reduced to less than 0.5 p.p.m.

References Cited
UNITED STATES PATENTS

| | | |
|---|---|---|
| 2,510,078 | 6/1950 | Compton et al. |
| 2,686,738 | 8/1954 | Teeters |
| 2,970,089 | 1/1961 | Hunt et al. _____ 203—91 |
| 3,101,304 | 8/1963 | Wiist _____ 203—80 X |

RALPH R. WILSON, Primary Examiner

U.S. Cl. X.R.

117—138.8; 206—84; 229—5.8, 2.5